United States Patent
Fujinuma

(10) Patent No.: US 7,370,976 B2
(45) Date of Patent: May 13, 2008

(54) PROJECTION TYPE IMAGE DISPLAY DEVICE

(75) Inventor: Tsuneo Fujinuma, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 11/798,264

(22) Filed: May 11, 2007

(65) Prior Publication Data
US 2007/0273985 A1    Nov. 29, 2007

(30) Foreign Application Priority Data
May 25, 2006   (JP) ............................ 2006-145490

(51) Int. Cl.
*G03B 21/00* (2006.01)
(52) U.S. Cl. ............................ 353/69; 353/34; 353/37; 353/70; 353/74; 348/744; 348/745; 348/746; 348/747; 348/749; 348/770; 382/254; 382/255; 382/256; 382/266; 382/267; 382/268; 382/269
(58) Field of Classification Search ........ 382/254–256, 382/266–269; 348/744–747, 749–771; 353/34, 353/37, 69, 70, 74–78
See application file for complete search history.

(56) References Cited

U.S. PATENT DOCUMENTS

| | | | | |
|---|---|---|---|---|
| 5,741,057 A * | 4/1998 | Goldberg et al. | ............. | 353/74 |
| 5,999,232 A * | 12/1999 | Kepley et al. | ............... | 348/744 |
| 6,616,283 B1 * | 9/2003 | Takano et al. | ................ | 353/74 |
| 6,661,473 B1 * | 12/2003 | Teshima et al. | ............ | 348/787 |
| 6,814,449 B2 * | 11/2004 | Yamada et al. | ............... | 353/74 |
| 6,883,920 B2 * | 4/2005 | Chen | .......................... | 353/119 |
| 7,072,002 B2 * | 7/2006 | Liao | ........................... | 348/787 |
| 2002/0044263 A1 * | 4/2002 | Takeuchi | ...................... | 353/69 |
| 2003/0137612 A1 * | 7/2003 | Chang et al. | ............... | 348/789 |
| 2003/0189695 A1 * | 10/2003 | Arai et al. | .................... | 353/77 |

FOREIGN PATENT DOCUMENTS

JP    2001-109071 A    4/2001
JP     2002-77777 A    3/2002

* cited by examiner

*Primary Examiner*—Evelyn A. Lester
(74) *Attorney, Agent, or Firm*—Birch, Stewart, Kolasch & Birch, LLP

(57) ABSTRACT

The device has flexure correcting means for operating to rotate a first eccentric cam provided at a central part of a first side of a reflecting mirror, thereby moving up and down the central part of the first side to correct the flexure of the reflecting mirror, torsion correcting means for operating to rotate a second eccentric cam or/and a third eccentric cam provided at the ends of a second side opposed to the first side of the reflecting mirror, thereby moving up and down both ends of the second side of the reflecting mirror to correct the torsion of the reflecting mirror, and a rotation operation portion provided at each of extended ends of camshafts provided at the eccentric cams to correct the flexure and torsion of the reflecting mirror.

3 Claims, 5 Drawing Sheets

FIG. 9A
FIG. 9B
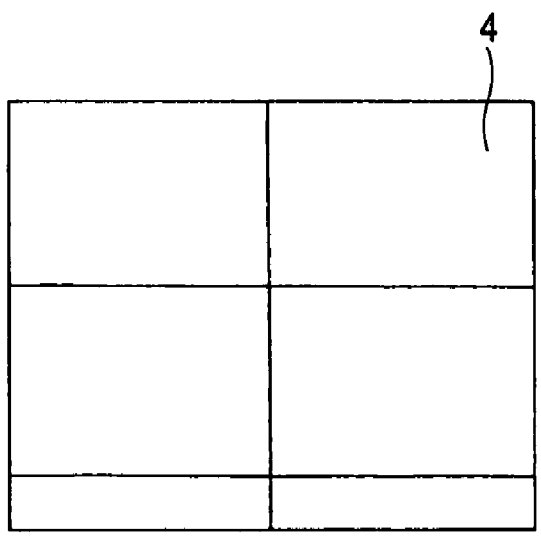
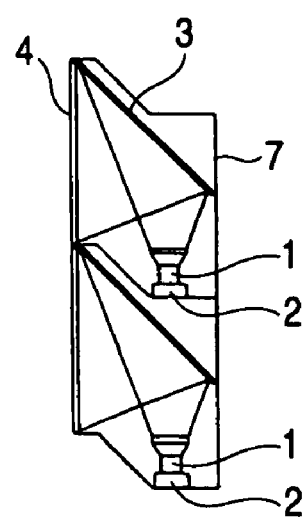

PROJECTION TYPE IMAGE DISPLAY DEVICE

BACKGROUND OF THE INVENTION

1. Field of the Invention

This invention relates to a projection type image display device that changes the optical path of an image from a projector using a reflecting mirror and projects a resultant image on a screen from behind, and more particularly to an image distortion correcting mechanism used to correct image distortions generated by the use of the reflecting mirror.

2. Description of the Related Art

As shown in FIG. 9, a multivision device includes a plurality of rear projection type image display devices (rear projectors) arranged in the vertical and horizontal directions, and the output images of the projectors are projected to display an image on a large screen.

In FIG. 9, a projector 1 provided in a prescribed lower position in a cabinet 7 emits an output image upwardly from its projection lens. The emitted output image has its optical path changed by a reflecting mirror 3 provided in a prescribed position in the cabinet and projected on a screen 4 provided at the front surface of the cabinet 7. A position adjuster 2 having the projector 1 thereon can adjust the position of the image to be projected on the screen 4 relative to the screen 4.

In the rear projection type image display device having the conventional reflecting mirror 3, it is difficult to accurately project an image from the projector 1 on the screen 4, and therefore the position adjuster (six-axis adjuster) is used to adjust the image in the optimum position. However, the position adjuster 2 is capable of adjusting only the position of the projector 1 in the vertical and horizontal directions, the magnifying/reducing direction, the rotation direction, and the vertical trapezoidal and horizontal trapezoidal directions, and is not capable of correcting image distortions generated by the reflecting mirror 3 and optically caused image distortions.

In order to improve the disadvantage, an adjusting mechanism that changes the flatness of the reflecting mirror 3 at its periphery depending on each necessary unit of the reflecting mirror 3 (see for example JP-A-2001-109071) is provided or the phenomenon that a projected image is distorted at the periphery (pincushion distortion) is corrected by pressing in a setscrew to press the vicinity of the center of each of the sides of the reflecting mirror 3 so that the reflecting mirror is deformed into an arch shape (see for example JP-A-2002-77777).

SUMMARY OF THE INVENTION

In the conventional projection type image display device, it is not easy to eliminate image distortions generated by the torsion of the reflecting mirror at the time of assembly and image distortions caused by the flexure of the reflecting mirror by its own weight after the installation of the device.

A projection type image display device according to this invention includes a reflecting mirror provided at a prescribed inclination angle with respect to the installation surface of a projector to reflect an image output from the projector onto a screen, flexure correcting means for operating to rotate a first eccentric cam provided at a central part of a first side of the reflecting mirror, thereby moving up and down the central part of the first side to correct the flexure of the reflecting mirror, torsion correcting means for operating to rotate a second eccentric cam or/and a third eccentric cam provided at respective ends of a second side opposed to the first side of the reflecting mirror, thereby moving up and down both ends of the second side of the reflecting mirror to correct the torsion of the reflecting mirror, and a rotation operation portion provided at each of extended ends of camshafts provided at the eccentric cams to correct the flexure and torsion of the reflecting mirror.

In the projection type image display device according to this invention, image distortions generated by the torsion of the reflecting mirror at the time of assembly and image distortions caused by the flexure of the reflecting mirror by its own weight after the installation of the device can be removed less costly by simple operation.

Furthermore, adjustment by the flexure correcting means and the torsion correcting means can be carried out in a location where the operator can easily reach (such as from the backside), and therefore when multiple image planes are provided, images can be adjusted without moving adjacent image display devices or dissembling the device, so that the adjacent image planes may appear as being united, and smooth large screen display is enabled.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 9 is a view of the internal structure of display devices as viewed from a side when multiple image planes are arranged.

DETAILED DESCRIPTION OF THE PREFERRED EMBODIMENTS

Figure 1:
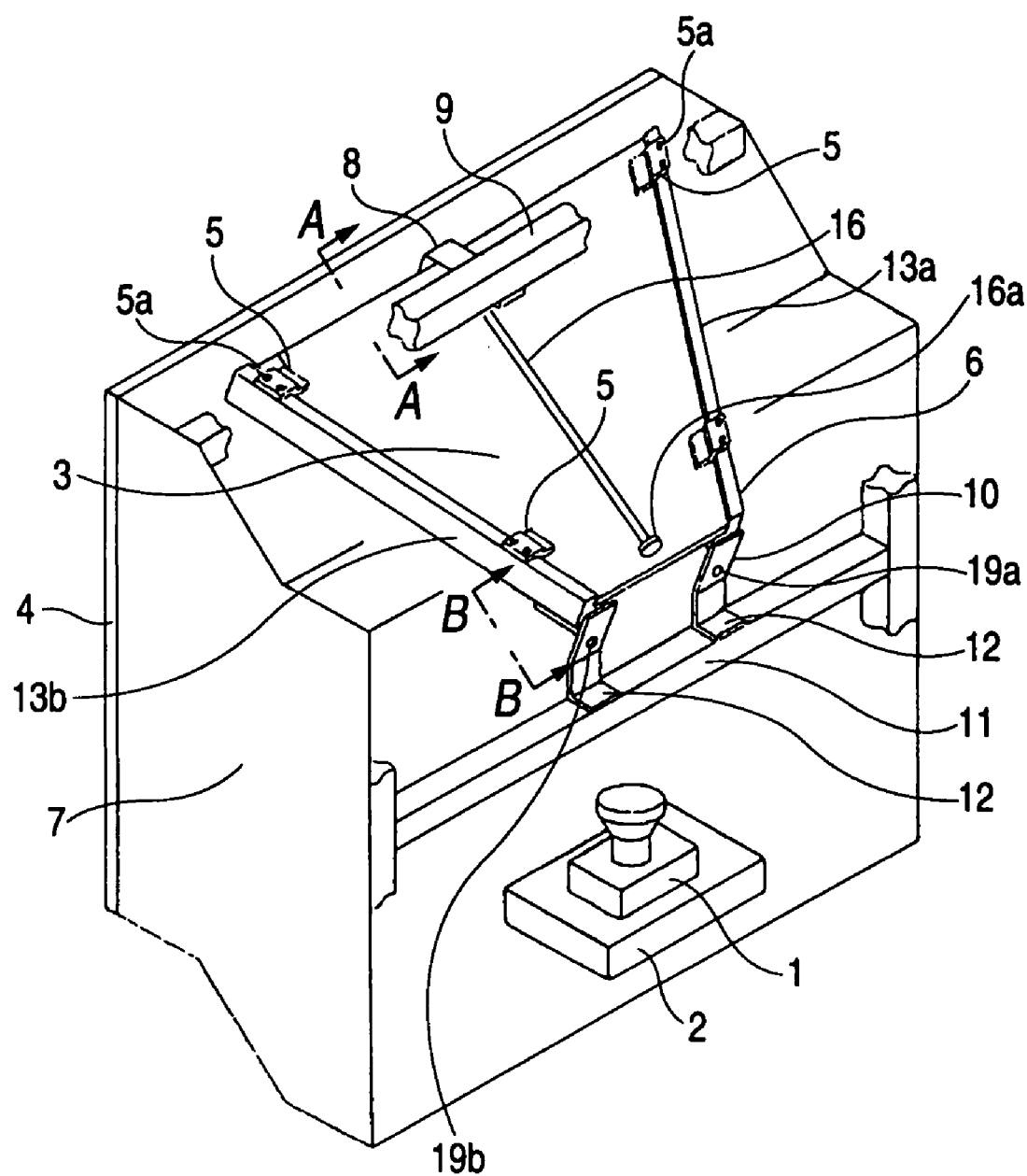
FIG. 1 is a perspective view of a main part of a rear projecting type image display device including an image distortion correcting mechanism according to a first embodiment of the invention when viewed from behind and from obliquely above.

Now, embodiments of the invention will be described in conjunction with the accompanying drawings.

In the drawings, the same reference characters refer to the same or corresponding portions.

First Embodiment

Figure 2:
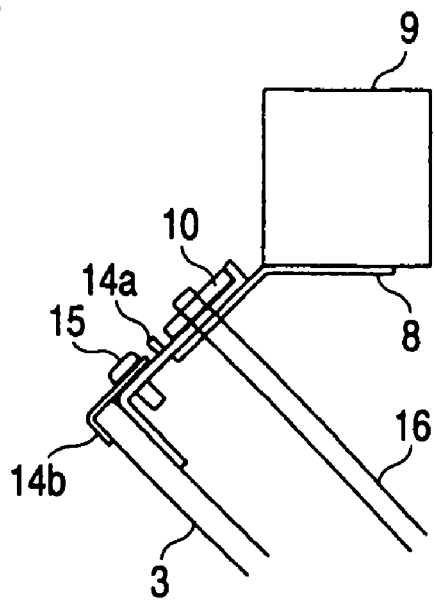
FIG. 2 is a sectional view of a main part of flexure correcting means taken along line A-A in FIG. 1 when viewed in the direction of the arrows.
Figure 3:
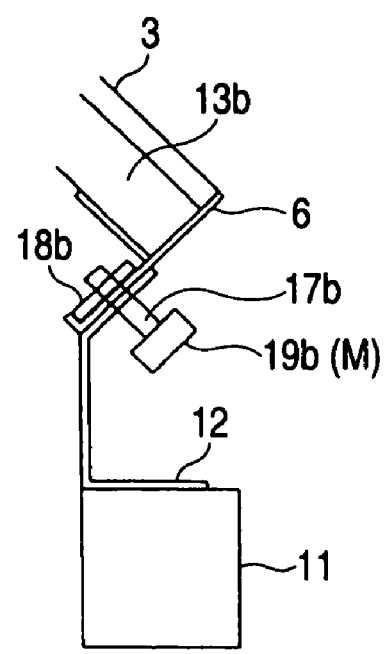
FIG. 3 is a sectional view of a main part of torsion correcting means taken along line B-B in FIG. 1 when viewed in the direction of the arrows.

FIG. 1 is a perspective view of a main part of a rear projection type image display device according to a first embodiment of the invention when viewed from behind and from obliquely above, FIG. 2 is a sectional view of the main part taken along line A-A in FIG. 1 when viewed in the direction of the arrows, and FIG. 3 is a sectional view taken along line B-B in FIG. 1 when viewed in the direction of the arrows.

The rear projection type image display device according to the first embodiment has the same basic structure as that of the rear projection type image display device in the multi-vision device described in conjunction with FIG. 9, and an image distortion correcting mechanism according to the invention is employed in the rear projection type image display device.

As shown in FIG. 1, the rear projection type image display device includes a projector 1 on a position adjuster 2 provided at the bottom in a cabinet 7, a rectangular or trapezoidal reflecting mirror 3 provided at a prescribed inclination angle with respect to the installation surface of the projector 1, and a screen 4 attached in the front. In this way, an image from the projector 1 has its optical path changed by the reflecting mirror 3 and projected on the screen 4.

The structure of how the reflecting mirror 3 is attached will be described in conjunction with FIGS. 1 to 3.

The reflecting mirror 3 has its right and left sides held as they are fixed to mirror holding portions 13a and 13b respectively such as L-shaped drawing members by fixing fittings 5 and fixing screws 5a, flexure correcting means (that will be described) is provided in the center of one side of the reflecting mirror 3, in other words, in the center of the upper side, and torsion correcting means (that will be described) is provided at both sides of another side of the reflecting mirror 3, in other words, at both sides of the lower side.

As shown in FIG. 2, the flexure correcting means includes a mirror holding member 14a, an L-shaped mirror holding member 14b, the moving member of a disk shaped first eccentric cam 10, and the fixed member of an upper side mirror support portion 8 fixed at the frame 9 of the cabinet 7. The reflecting mirror 3 has its upper side center held between the mirror holding members 14a and 14b and the three elements are integrated by a screw 15.

The mirror holding members 14a and 14b are supported by the first eccentric cam 10 so that they slide on the inclined surface of the mirror support portion 8, and the first eccentric cam 10 rotates to correct the flexure of the reflecting mirror 3 by moving up and down the central part of the upper side of the reflecting mirror 3.

The first eccentric cam 10 has a camshaft 16 penetrating through the mirror holding member 14a and the upper side mirror support portion 8 and extending to the backside of the cabinet 7, and a rotation operation portion 16a provided at its lower end is operated to rotate the first eccentric cam 10. In this way, the rotation of the first eccentric cam 10 caused by operating the rotation operation portion 16a allows the reflecting mirror 3 to move along the support portion 8. The camshaft 16 of the first eccentric cam 10 is movably fitted to the elongate hole of the mirror holding member 14a so that the mirror holding member 14a integrated with the reflecting mirror 3 can move along the inclined surface of the mirror support portion 8.

As shown in FIG. 3, the torsion correcting means includes a lower side mirror support portion 12 fixed to the frame 11 at the backside of the cabinet 7, a lower mirror holding portion 6, second and third eccentric cams 18a and 18b, the camshafts 17a and 17b of the second and third eccentric cams, and rotation operation portions 19a and 19b.

Note that the second eccentric cam 18a and the third eccentric cam 18b are provided on the respective sides of the lower side of the reflecting mirror 3, and the second eccentric cam 18a or/and the third eccentric cam 18b are operated to rotate by the rotation operation portions 19a and 19b, so that both sides of the lower side of the reflecting mirror 3 are moved up and down in the same manner as the flexure correcting means to correct the torsion of the reflecting mirror 3.

The lower mirror holding member 6 is supported by the second eccentric cam 18a and the third eccentric cam 18b so as to slide on the inclined surface of the mirror lower side support portion 12. The camshafts 17a and 17b of the second eccentric cam and the third eccentric cam are movably fitted into the elongate hole of the lower mirror holding member 6 so that the lower mirror holding member 6 integrated with the reflecting mirror 3 can move along the inclined surface of the mirror lower side support portion 12.

As described above, the members used to move the reflecting mirror 3 can be adjusted in the center of the backside of the device where the operator can reach by his/her hand, and the flexure or torsion of the reflecting mirror 3 can be corrected for example simply by removing the backside cover of the device, so that a distortion-free good image can be projected on the screen 4.

In the above-described example, the backside cover is removed, but the camshafts 16, 17a, and 17b may be protruded from the backside cover, so that adjustment can be made without removing the backside cover.

Figure 5:
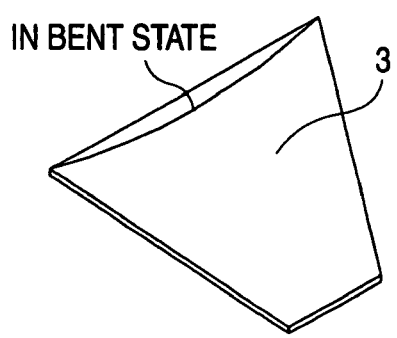
FIG. 5 is a perspective view of state of a reflecting mirror flexed from its normal position.
Figure 6:
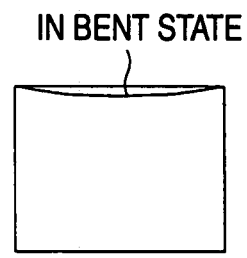
FIG. 6 is a view of an image projected on a screen as viewed from the front when the reflecting mirror is flexed as shown in FIG. 5.
Figure 7:
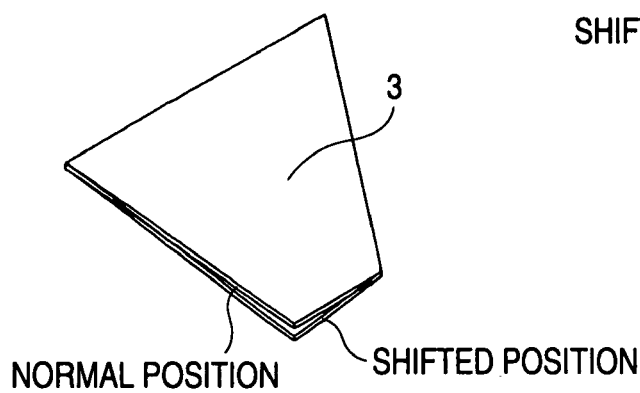
FIG. 7 is a perspective view when the reflecting mirror is not in the same plane.
Figure 8:
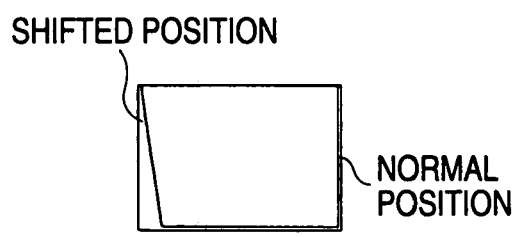
FIG. 8 is a view of an image having a non-equal-side trapezoid distortion generated on the screen as viewed from the front when the reflecting mirror is not in the same plane as shown in FIG. 6.

FIG. 5 is a perspective view of the state of the reflecting mirror 3 flexed from its normal position, and FIG. 6 is a view of an image projected on the screen 4 while the reflecting mirror 3 is flexed as shown in FIG. 5 when the image is viewed from the front, FIG. 7 is a perspective view while the reflecting mirror 3 is not in the same plane, and FIG. 8 is a view of an image with a non-equal-side trapezoid distortion generated on the screen while the reflecting mirror 3 is not in the same plane as shown in FIG. 6 when the image is viewed from the front. The flexure and torsion of the reflecting mirror 3 are corrected by the correcting means.

Second Embodiment

According to a second embodiment, for example a driving motor M that operates to rotate the third eccentric cam 18b is provided at the lower end of the camshaft 17b of the third eccentric cam as shown in FIG. 3.

The driving motor M is provided at the lower end of each of the other camshafts 16 and 17a of the other eccentric cams, and using the driving motor M, the flexure and torsion of the reflecting mirror 3 are corrected.

In this way, remote control is enabled, so that the operation while checking the image on the screen can be carried out. Note that the motor M may be connected as it is incorporated in the device while it may be provided as a detachable element.

Third Embodiment

Figure 4:
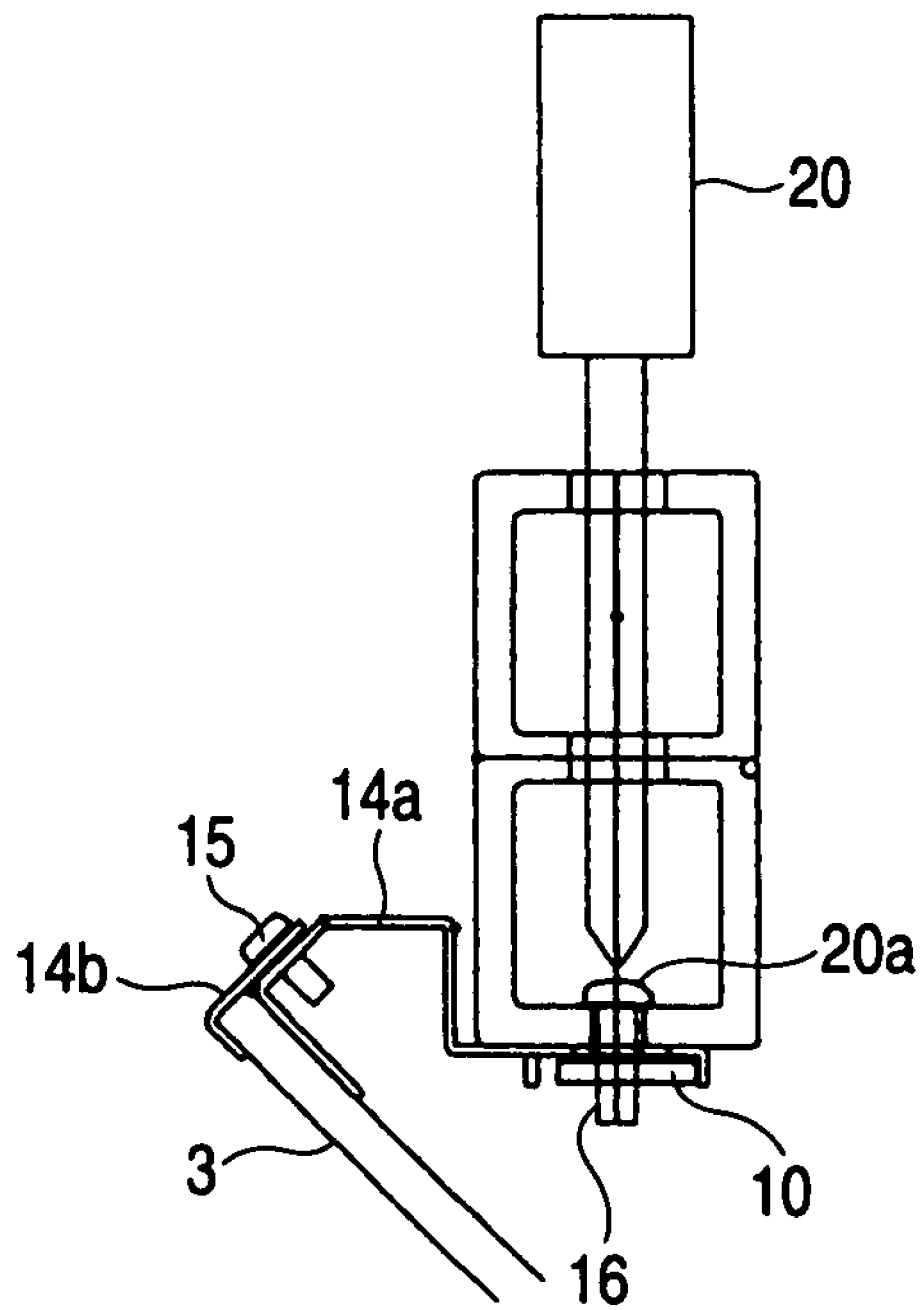
FIG. 4 is a sectional view of a main part of an image distortion correcting mechanism according to a third embodiment when viewed from the same position as line A-A in FIG. 1.

FIG. 4 is a sectional view of a main part of an image distortion correcting mechanism according to a third embodiment, which is applied to the same part as that shown in FIG. 2.

As shown in FIG. 4, an engaging groove 20a for a driver that operates to rotate the first eccentric cam 10 is provided at an end surface of the camshaft 16 of the first eccentric cam.

The driver engaging groove 20a is also provided at each of the end surfaces of camshafts 17a and 17b of the other eccentric cams and the driver M is operated to rotate each of the eccentric cams 18a and 18b, so that the flexure/torsion of the reflecting mirror 3 is corrected.

As in the foregoing, the number of adjusting elements can be reduced, and a through hole (not shown) is provided at the bottom of each of the display devices placed on one another at the time of assembling multiple image planes, so that the screen 4 of the upper display device may be removed for adjustment. In this case, although the screen 4 of the upper device must be removed, images can be adjusted less costly.

Various modifications and alterations of this invention will be apparent to those skilled in the art without departing from the scope and spirit of this invention, and it should be understood that this is not limited to the illustrative embodiments set forth herein.

What is claimed is:

1. A projection type image display device, comprising:
    a reflecting mirror provided at a prescribed inclination angle with respect to the installation surface of a projector to reflect an image output from the projector onto a screen;
    flexure correcting means for operating to rotate a first eccentric cam provided at a central part of a first side of the reflecting mirror, thereby moving up and down the central part of the first side to correct the flexure of the reflecting mirror;
    torsion correcting means for operating to rotate a second eccentric cam or/and a third eccentric cam provided at respective ends of a second side opposed to said first side of the reflecting mirror, thereby moving up and down both ends of said second side of the reflecting mirror to correct the torsion of the reflecting mirror; and
    a rotation operation portion provided at each of extended ends of camshafts provided at the eccentric cams to correct the flexure and torsion of the reflecting mirror.

2. The projection type image display device according to claim 1, wherein a driving motor is provided at an end of the camshaft of each of the eccentric cams, so that the flexure and torsion of the reflecting mirror are corrected using the driving motor.

3. The projection type image display device according to claim 1, wherein an engagement groove for a driver that operates to rotate each of the eccentric cams is provided at an end surface of the camshaft of each of the eccentric cams, so that the flexure and torsion of the reflecting mirror are corrected using the driver.

* * * * *